United States Patent
Müllner

(10) Patent No.: US 6,538,864 B2
(45) Date of Patent: Mar. 25, 2003

(54) PROTECTIVE CIRCUIT FOR AN ELECTRONIC DEVICE

(75) Inventor: Thomas Müllner, Wolfpassing (AT)

(73) Assignee: Siemens AG Osterreich, Vienna (AT)

(*) Notice: Subject to any disclaimer, the term of this patent is extended or adjusted under 35 U.S.C. 154(b) by 0 days.

(21) Appl. No.: 09/977,617

(22) Filed: Oct. 15, 2001

(65) Prior Publication Data

US 2002/0057078 A1 May 16, 2002

Related U.S. Application Data

(63) Continuation of application No. PCT/AT00/00046, filed on Feb. 22, 2000.

(30) Foreign Application Priority Data

Apr. 14, 1999 (AT) .................................................. 666/999

(51) Int. Cl.$^7$ .............................. H02H 9/02; H02J 1/00
(52) U.S. Cl. ......................... 361/58; 323/318; 323/908
(58) Field of Search ................................ 323/382, 283, 323/284, 319, 905, 318, 907, 908; 361/58, 110, 111

(56) References Cited

U.S. PATENT DOCUMENTS 3,529,210 A * 9/1970 Ito et al. ........................ 361/58
4,555,741 A * 11/1985 Masaki ........................ 361/58
5,811,963 A * 9/1998 Elwell ........................ 323/318

FOREIGN PATENT DOCUMENTS

JP          06-303721      * 3/1994

* cited by examiner

*Primary Examiner*—Rajnikant B. Patel
(74) *Attorney, Agent, or Firm*—Thomas R. Vigil; Welsh & Katz, Ltd.

(57) ABSTRACT

The protective circuit for an electronic device is located between a DC source ($U_V$) and the circuit voltage input of the device (G). The protective circuit comprises the serial connection of a diode ($D_V$) and a limiting resistor ($R_V$). The series connected diode ($D_V$) and the limiting resistor ($R_V$) are connected and parallel with a control switch (S). A circuit voltage ($U_B$, $U_A$) of the device (G) is connected to a voltage monitoring element (W) which emits a switch signal (S) which closes the switch (S) when a determined minimum value of the circuit voltage ($U_B$) is reached.

2 Claims, 2 Drawing Sheets

PROTECTIVE CIRCUIT FOR AN ELECTRONIC DEVICE

BACKGROUND OF THE INVENTION

1. Field of the Invention

The invention relates to a protective circuit for a power supply unit that is located between a constant voltage source and the operating voltage input of the device and consists of a diode and a limiting resistor connected in series, the diode and the limiting resistor being bridged by a relay normally open contact that may be closed as soon as a predeterminable minimum valve of a voltage of the power supply unit, to which a field winding of the relay is connected, has been reached.

A plurality of electronic devices, such a switching power supply units for example, are fed from a constant voltage source, a battery for example, or from a local constant voltage network. When the device is connected to the constant voltage source with the wrong polarity, expensive component parts of the device may be destroyed as a result thereof so that a reverse battery protection is provided for in the form of a diode or a diode bridge for example. Due to inductive and/or capacitive component parts, the connection of the device to the constant voltage source may furthermore lead to very high transient current pulses, which also may cause the destruction of component parts. Although this may be prevented in many cases by fast blow fuses, e.g., safety fuses, it requires lots of work to replace the fuses; therefore, a limiting resistor, more specifically a thermistor, is used to limit inrush current.

In operation, such type protective circuits, consisting for example of a diode and a thermistor, produce permanent losses which reduce the overall efficiency of the device. When the device has an input current of 2 A and when a diode and a 1-ohm limiting resistor are being used, the additional permanent loss amounts to approximately 5 Watt.

2. Description of the Prior Art

A protective circuit that substantially corresponds to the type mentioned herein above has been disclosed in the German Patent No. DE 33 08 320 A1. By means of a control circuit that detects the voltage difference between a supply voltage and a consumer, a controlled switch, such as a relay or a semiconductor switch for example, is gated in such a manner that the switch only closes, and thereby bridges the limiting resistor, when the voltage difference between supply voltage and consumer has dropped below a certain value. As the complete evaluation of the voltage difference and the gating of the switch occur electronically, the expenditure is quite high and there still is a certain failure probability.

BRIEF SUMMARY OF THE INVENTION

It is an object of the present invention to provide a protective circuit that will not only cause considerably less permanent losses but that also is simple and inexpensive in construction and particularly reliable as well.

The solution to this object is a protective circuit of the type mentioned herein above in which, in accordance with the invention, the field winding of the relay is connected to the output voltage of the power supply unit.

The invention offers the protection aimed at with minimum expenditure and also operates when an error occurs at the separate potential output.

If a buffer resistor of low impedance is located in series with the controlled switch, disturbances in switching are kept particularly low although slightly higher losses have to be accepted.

BRIEF DESCRIPTION OF THE SEVERAL VIEWS OF THE DRAWINGS

The invention and all of its advantages will be apparent from the following more particular description of exemplary embodiments as illustrated in the drawing in which.

DETAILED DESCRIPTION OF THE INVENTION

Figure 1:
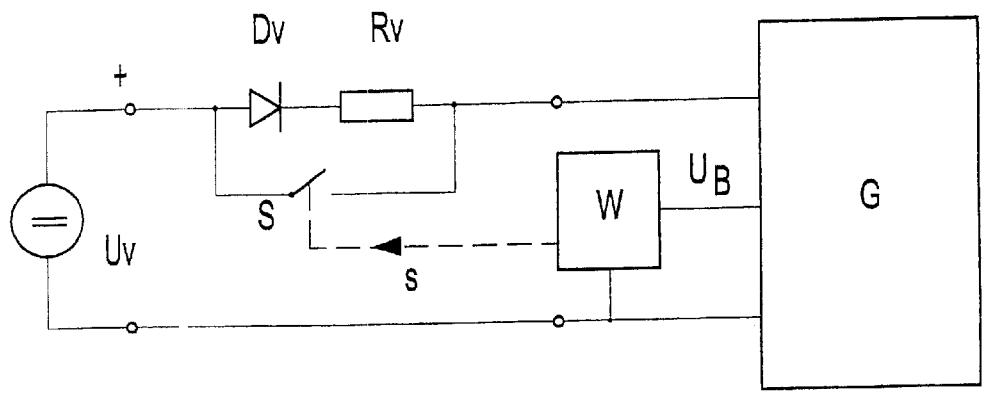
FIG. 1 is a basic illustration of a protective circuit in accordance with the invention.

The invention and all of its advantages will be apparent from the following more particular description of exemplary embodiments as illustrated in the drawing. The unique figure thereof is a view of a protective circuit in accordance with the invention intended for use in a power supply unit, utilizing a relay.

In the embodiment shown, the power supply unit G is a switching power supply unit G that is fed from a constant voltage source $U_V$, an intermediate circuit voltage for example, and delivers an output constant voltage $U_A$. In the positive input line of the power supply unit G, a diode $D_V$ and a protective resistor $R_V$ are connected in series in a manner well known in the art, this series connection being bridged by a normally open contact a of a relay A,a. The field winding A of the relay has, at the constant voltage output of the power supply unit G, a nominal output voltage $U_A$. The relay, or the relay winding respectively, is dimensioned in such a manner that, when the output voltage $U_A$. The relay, or the relay winding respectively, is dimensioned in such a manner that, when the output voltage $U_A$ reaches a determined value, the relay responds, the contact a closes and the series connection $R_V/D_V$ bridges. In addition to the low contact resistance of the normally open contact a, the use of a relay A, a also has the advantage of indirect coupling that may be necessary with a power supply unit.

When switching the power supply unit G to the power supply voltage $U_V$ with the proper polarity, a current that is limited by the resistor $R_V$ will flow into the power supply unit G, the output voltage $U_A$ of which will increase until the excitation of the coil of relay A, a is high enough for the normally open contact a to close. The operating voltage for the device G now passes through a buffer resistor $R_d$ of low impedance. This buffer resistor is intended to prevent extreme voltage peaks and, as a result thereof, high-frequency disturbances, but in many cases it may be dispenses with.

If the constant current for the power supply unit G is assumed to be 2 A and the contact resistance of the relay to be 10 m ohm the permanent power loss is of 40 m W. If, by contrast, at the same current of 2 A, the loss at the diode $D_V$ is 0.7×2 A, i.e., 1.4 W, and if a limiting resistor such as a thermistor with an operational resistance of 1 ohm is being used, the ohmic loss is of 4 W and the overall permanent power loss of 5.4 W. This power loss is two orders of magnitude higher than without using a protective circuit.

It should be noted at this point that the limiting resistor $R_V$ may be dispensed with or be considered as being included in the diode when the forward resistance of diode $D_V$ has a value that is high enough for the respective one of the current limitation wanted.

Figure 2:
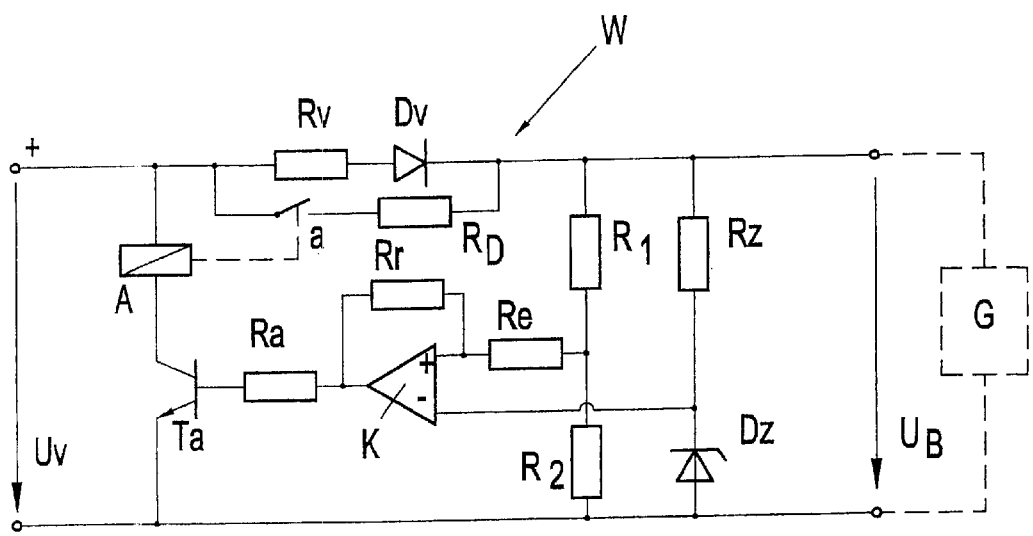
FIG. 2 is a view of a protective circuit in accordance with the invention, utilizing a relay.

In a practical realization according to FIG. 2, the monitoring circuit W is connected between a constant voltage $U_V$ and the input operating voltage $U_B$ of the device G. In the positive line, a diode $D_V$ and a limiting resistor $R_V$ are again located in series, this series connection being bridged by a normally open contact of a relay A and a buffer resistor $R_V$ being, in this exemplary embodiment, located in series with the normally open contact a. A comparator K is provided for monitoring the voltage. The positive input of this comparator K is supplied with the voltage, which is proportional to the operating voltage $U_B$ of the device G, said voltage having been gathered from a voltage distributor R1/R2 and passed through a resistor $R_e$ whereas the voltage at the negative input of the comparator K is the voltage of a Zener diode $D_Z$ in the form of a reference voltage. The current passing through the Zener diode $D_Z$ is produced by means of a resistor $R_Z$. The out put of the comparator K, which is here provided with a resistor $R_r$, is supplied to the base of a transistor $T_a$ via a limiting resistor $R_a$ in the collector circuit of which there is located the field winding A of relay A, a, whereas the emitter of transistor $T_a$ is located at the negative line.

When switching the device G to the power supply voltage with the proper polarity, a current that is limited by the resistor $R_V$ will flow into the device G, the operating voltage $U_B$ of which will increase to the same extend as the voltage at the positive input of comparator K, and, as soon as a value is reached that exceeds the voltage of the Zener diode $D_Z$, the comparator K will switch through, gate the transistor $T_a$ and energize the coil of relay A, a. The normally open contact a closes and the operating voltage for the device G now passes through the buffer resistor $R_d$. This buffer resistor is intended to prevent extreme voltage peaks and, as a result thereof, high-frequency disturbances, but in many cases it may be dispensed with.

If the constant current for the device G is assumed to be 2 A and the contact resistance of the relay to be 10 m ohm the permanent power loss is of 40 m W. If, at the same current of 2 A, the loss at the diode $D_V$ is 0.7×2 A, i.e., 1.4 W, and if a limiting resistor such as a thermistor with an operational resistance of 1 ohm is being used, the ohmic loss is of 4W and the overall permanent power loss of 5.4 W. This power loss is two orders of magnitude higher than with the protective circuit according to the invention.

Figure 3:
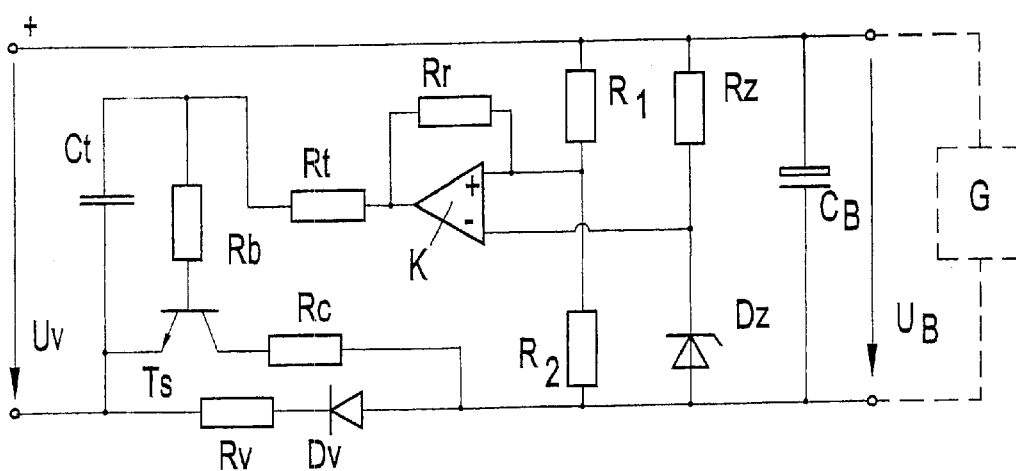
FIG. 3 is a view of a protective circuit in accordance with the invention, utilizing a switching transistor.

A variant of the invention utilizing a switching transistor $T_a$ is shown in FIG. 3. In principle, this circuit resembles the one of FIG. 2 but for the relay contact that is replaced by the emitter-collector-path of the switching transistor $T_a$, said switching transistor being supplied from the output of comparator K to the base of the switching transistor $T_a$ via a resistor $R_c$ and a dropping resistor $R_b$, a resistor $R_c$ being located in the collector of said transistor. As soon as, after connecting the device, the operating voltage $U_B$ has reached a determined value that can be determined by the Zener diode $D_Z$ or by the voltage distributor R1/R2 respectively, the switching transistor $T_a$ is switched through and bridges the diode $D_V$ and the dropping resistor $R_V$. The resistor $R_c$ again serves to prevent extreme current peaks. FIG. 3 also shows how for example a "slow" connection of the transistor may be achieved in order to additionally limit the maximum input current. The illustrated resistor $R_c$ together with a capacitor $C_t$ serves this purpose, the switching delay and the rise of the current through transistor $T_s$ respectively being determined by the time constant of the $R_C$ element $R_t/C_t$. Of course, this $R_C$ element may also be dispensed with, the capacitor $C_t$ being omitted and the resistor $R_t$ being replaced by a short circuit in this case.

Figure 4:
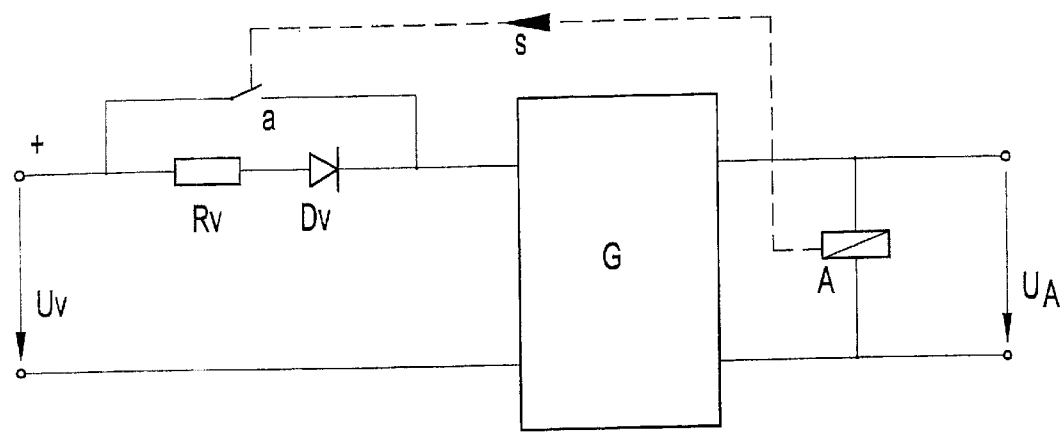
FIG. 4 is a view of a protective circuit in accordance with the invention for a power supply unit utilizing a relay.

The embodiment according to FIG. 4 illustrates an exemplary embodiment in which the device is a power supply unit, e.g., a switching power supply unit, that is fed from a constant voltage source $U_v$, an intermediate circuit voltage for example, and has an output constant voltage $U_A$. In the positive input line of the device G, the diode $D_v$ and the protective resistor $R_v$ are connected in series in a manner well known in the art, this series connection being bridged by a normally open contact of a relay A, a. The field winding A of the relay has, at the constant voltage output of the power supply unit G, a nominal output voltage $U_A$. The relay, or the relay winding respectively, is dimensioned in such a manner that, when the output voltage $U_A$ reaches a determined value, the relay responds, the contact a closes and the series connection $R_V/D_V$ bridges. In addition to the low contact resistance of the normally open contact a, the use of a relay A, a also has the advantage of indirect coupling that may be necessary with a power supply unit for example.

Figure 5:
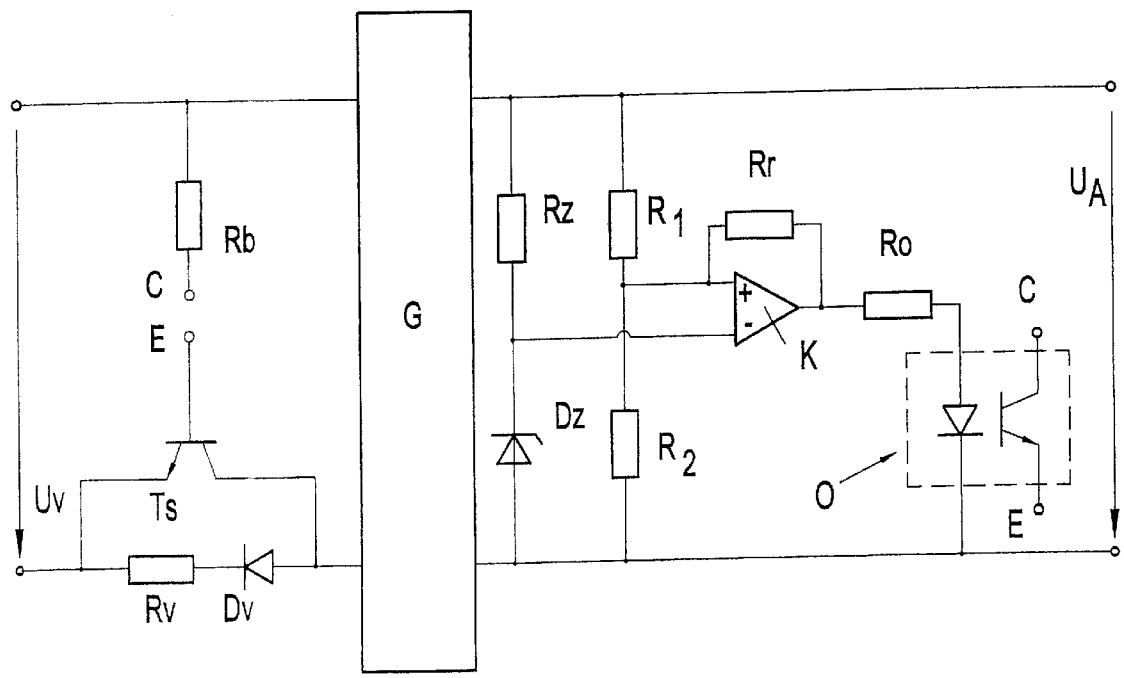
FIG. 5 is a view of a protective circuit in accordance with the invention for a power supply unit utilizing an optocoupler and a switching transistor.

Another variant of the invention according to FIG. 5 also illustrates an indirect coupling, although here, in a way similar to that shown in FIG. 3, a switching transistor $T_S$ is being used. In the protective circuit according to FIG. 5, the output voltage of a power supply unit G is monitored and is supplied to the positive input of a comparator K via a voltage distributor R1/R2. At the negative input of comparator K there is the Zener voltage of a diode $D_Z$ with a dropping resistor $R_Z$ and the comparator K, which has a feedback resistor $R_r$, gates the diode of an optocoupler O via a resistor $R_O$. Collector C and emitter E of the transistor pertaining to the optocoupler are connected to the input side of the power supply unit G at the points labeled with the respective letters C and E and, when the optocoupler switches through, a base current flows through a resistor $R_b$, the transistor of the optocoupler and into the base of the switching transistor $T_s$ that now switches through.

What is claimed is:

1. A protective circuit for a power supply unit (G) that is located between a constant voltage source ($U_V$) and the operating voltage input of the device (G) and consists of a diode ($D_V$) and a limiting resistor ($R_V$) connected in series, the diode ($D_V$) and the limiting resistor being bridged by a relay normally open contact (a) that may be closed as soon as a predeterminable minimum value ($U_M$) of a voltage of the power supply unit (G), to which a field winding (A) of relay (A, a) is connected, has been reached, wherein
  the field winding (A) of relay (A, a) is connected to the output voltage ($U_A$) of the power supply unit (G).

2. The protective circuit of claim 1, wherein a buffer resistor ($R_D$) of low impedance is located in series with the normally open contact (a).

* * * * *